(12) United States Patent
Kumar et al.

(10) Patent No.: US 12,081,389 B1
(45) Date of Patent: Sep. 3, 2024

(54) RESOURCE RETENTION RULES ENCOMPASSING MULTIPLE RESOURCE TYPES FOR RESOURCE RECOVERY SERVICE

(71) Applicant: Amazon Technologies, Inc., Seattle, WA (US)

(72) Inventors: Sandeep Kumar, Sammamish, WA (US); Venkatesh Nagapudi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 17/937,042

(22) Filed: Sep. 30, 2022

(51) Int. Cl.
*G06F 11/14* (2006.01)
*H04L 41/0654* (2022.01)
*H04L 41/0894* (2022.01)

(52) U.S. Cl.
CPC ...... *H04L 41/0654* (2013.01); *H04L 41/0894* (2022.05)

(58) Field of Classification Search
None
See application file for complete search history.

(56) References Cited

U.S. PATENT DOCUMENTS 10,397,236 B1 * 8/2019 Chadha ............... G06F 11/3476
2021/0096957 A1 * 4/2021 Rahman ............... G06F 11/1471

* cited by examiner

*Primary Examiner* — Natisha D Cox
(74) *Attorney, Agent, or Firm* — Knobbe, Martens, Olson & Bear, LLP (57) ABSTRACT

Provided is a system for facilitating recovery of deleted computing resources in a cloud network environment. A centralized resource recovery service may communicate with a plurality of resource management services that are each configured to create, modify, or delete their respective computing resources such as storage volumes, databases, and compute instances. The resource recovery service may allow configuration of resource group policies such that deletion of grouped resources can be managed more effectively and efficiently. For example, in the event that a deleted resources matches multiple resource retention rules, the resource retention rule that encompasses multiple resource types may be used to place the deleted resource in a recoverable state so that resources of such multiple resource types can be managed according to the same resource retention.

20 Claims, 5 Drawing Sheets

RESOURCE RETENTION RULES ENCOMPASSING MULTIPLE RESOURCE TYPES FOR RESOURCE RECOVERY SERVICE

BACKGROUND

Modern computer systems are frequently implemented as distributed collections of computer systems operating collectively within one or more host computer system environments. Such a host computer environment may deploy computing resources across multiple servers or virtual machines and manage the computing resources on behalf of customers.

DETAILED DESCRIPTION

Introduction

The present disclosure relates to techniques for facilitating recovery of deleted computing resources in a cloud network environment. Existing recovery bin solutions may allow recovery of accidentally deleted resources by configuring retention rules that allow such computing resources to be placed in a recoverable state upon deletion. However, such retention rules may be resource-type-specific in that a retention rule that is configured to be triggered by resources of one resource type having a matching tag "legal document, retain for ten years" may not be triggered by resources of another resource type even if those resources had the same matching tag (and it was intended that the retention rule would be triggered). Because many of the resources on a cloud network environment may work in tandem with other resources, if two resources require each other to function properly, placing one in a recoverable state while permanently deleting the other, or vice versa, may not result in a desirable outcome, especially when the resource placed in the recoverable state needs to be restored because the restored resource may require the permanently deleted resource to function properly.

These aforementioned challenges, among others, are addressed in some embodiments by the disclosed techniques for configuring resource retention rules that encompass multiple resource types and/or multiple resource management services. These techniques can implement resource retention rules that effectively link or group particular resource types such that the lifecycle management of linked, related, or interdependent resources can be improved and simplified.

As will be appreciated by one of skill in the art in light of the present disclosure, the embodiments disclosed herein improve the ability of computing systems and systems that manage computing resources, such as data storage systems and compute systems, to provide mechanisms for recovering and restoring resources that were previously deleted or otherwise made unavailable. Further, by configuring resource retention rules that encompass multiple categories of resources such as multiple resource types and/or multiple resource management services, the cloud provider network of the present disclosure can improve security, efficiency, and user experience and as well as address the deficiencies described above.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Resource Recovery Service

Figure 1:
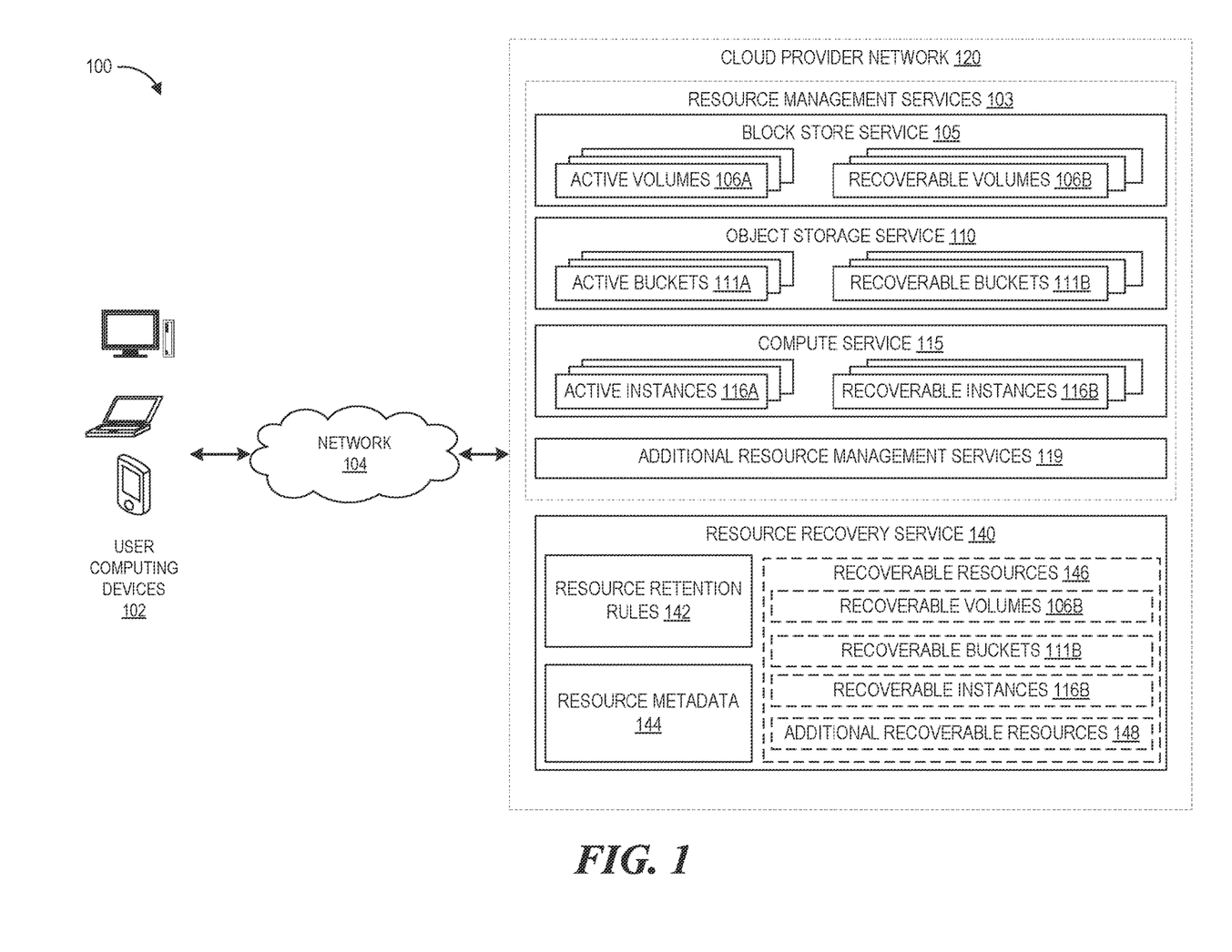
FIG. 1 depicts a schematic diagram of a network environment in which a cloud provider network is used to implement a resource recovery service in accordance with aspects of the present disclosure.

FIG. 1 depicts an example computing environment 100 including a cloud provider network 120 in which the disclosed resource recovery service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for facilitating resource recovery may be implemented in non-elastic computing environments as well.

The cloud provider network 120 can be accessed by user computing devices 102 over a network 104. The cloud provider network 120 may include resource management services 103, which include block store service 105, object storage service 110, compute service 115, and additional resource management services 119. The cloud provider network 120 may also include a resource recovery service 140, which includes resource retention rules 142 (also referred to herein as resource recovery rules, resource recovery conditions, or resource retention conditions), resource metadata 144, and recoverable resources 146 (also referred to herein as recovery bin, which can be interchangeable with recycle bin, temporary storage bin, etc. in some cases), which include the recoverable resources 106B, 111B, and 116B from the resource management services 103 and additional recoverable resources 148. The components of the cloud provider network 120 are in networked communication with one another and with the network 104 to provide users with on-demand access to the services and resources provided by the cloud provider network 120.

The resource recovery service 140 provides (i) the resource retention rules 142, which are usable by the resource recovery service 140 to determine which, if any, resource retention rule or condition applies to the delete request received from the resource management service (where the resource retention rules 142 may, for example, encompass a single resource type or multiple resource types), and (ii) the resource metadata 144, which are usable by the resource recovery service 140 to determine whether and when a resource retained in the recovery bin should be evicted, and whether eviction has been suspended. The term "eviction" may refer to permanently deleting a resource that was previously placed in a recovery bin or previously placed in a recoverable state. The resource retention rules 142 may indicate which tags (or other information such as keyword, etc.) are associated with which recovery policy (e.g., whether to place in recycle bin, how long the resource should be retained in the recovery bin before automatic permanent deletion, whether manual, user-requested eviction is allowed, whether eviction has been suspended (for all resources, or for resources deleted before, during, or after a specific time period), etc.) and also indicate the types or categories of resources to which the resource retention rules 142 are applicable (e.g., a list of the specific resource types that should be governed by the given resource retention rule, a list of the specific resource management services whose deleted resources should be governed by the given resource retention rule, etc.), and the resource metadata 144 of a resource may indicate tags (or other information such as keyword, etc.) that can be used to determine whether the resource satisfies any of the resource retention rules 142. As described herein, a resource type may indicate the type of the computing resource such as, for example but not limited to, snapshot, compute instance, collection or stack of multiple resources, machine image, security group, storage volume, network interface, backup, disk, storage bucket, and the like. In some implementations, the resource type of a given resource may indicate the type or identity of the resource management service that manages the given resource (e.g., a service that manages snapshots, a service that manages compute instances, a service that manages collections or stacks of multiple resources, a service that manages machine images, a service that manages security groups, a service that manages storage volumes, a service that manages network interfaces, a service that manages backups, a service that manages disks, a service that manages storage buckets, and the like).

In some embodiments, the resource retention rules 142 may be added, modified, or deleted by any user having access to the underlying resources that would be governed by such rules. In other embodiments, a user (or a set of users) that is different from the user(s) having access to the underlying resources is authorized to add, modify, or delete the resource retention rules 142. In some embodiments, there is an overlap in the set of users authorized to access the underlying resources and the set of users authorized to modify the resource retention rules 142. In other embodiments, there is no overlap in the set of users authorized to access the underlying resources and the set of users authorized to modify the resource retention rules 142. The techniques for facilitating resource recovery are described in greater detail below with reference to FIGS. 2-4.

The resource recovery service 140 may provide a set of application programming interfaces ("APIs") that can be used by the users of the user computing devices 102 to create, modify, and delete resource retention rules, and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. For example, the resource recovery service 140 may provide a create resource retention rule API that allow the user to create and configure the properties of a resource retention rule such that, for example, the resource retention rule encompasses multiple resource types as described herein.

Although not shown in FIG. 1, some implementations of cloud provider network 120 can additionally include domain name services ("DNS") servers, relational database servers, and other server configurations (not illustrated) for supporting on-demand cloud computing system. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing system to users through the network 104, for example allowing users to have at their disposal scalable "virtual computing devices" via their use of the block store service 105, object storage service 110, and compute service 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the block store service 105, object storage service 110, and compute service 115. The data centers within an availability zone and the availability zones within a region are connected to one another through private, low-latency links, for example fiber optic network cables. This compartmentalization and geographic distribution of computing hardware enables the cloud provider network 120 to provide fast service to users on a global scale with a high degree of fault tolerance and stability. To distribute resources evenly across the zones in a given region, the provider of the cloud provider network 120 may independently map availability zones to identifiers for each user account.

Turning specifically to the roles of the different servers within the cloud provider network 120, the compute service 115 include one or more servers on which provide resizable computing capacity to users for building and hosting their software systems. Users can use the compute service 115 to launch as many virtual computing environments, referred to as "instances" 116, as they need. Instances 116 can have various configurations of processing power, memory, storage, and networking capacity depending upon user needs. As shown in FIG. 1, the instances 116 may include active instances 116A (e.g., instances that are accessible by their users and have not been deleted) and recoverable instances 116B (e.g., instances that have been deleted and placed in the recovery bin). The compute service 115 can also include computer storage for temporary data used while an instance is running, however as soon as the instance is shut down this data is lost.

The block store service 105 provide persistent data storage for the compute service 115 in the form of volumes 106. As shown in FIG. 1, the volumes 106 may include active volumes 106A (e.g., volumes that are accessible by their users and have not been deleted) and recoverable volumes 106B (e.g., volumes that have been deleted and placed in the recovery bin). The block store service 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. The snapshots described herein may include any number of such blocks. The size of a snapshot may vary, depending for example upon the size of the user volume for which the snapshot is created.

User volumes 106, which can be treated as an individual hard drive ranging for example from 1 GB to 1 terabyte TB (or more) in size, are made of one or more blocks stored on the block store service 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute service 115. Each volume may be attached to a single instance running on a compute server 115, and can be detached from that instance and re-attached to another. The block store service 105 may have built-in redundancy for volumes by replicating the volume across multiple servers within an availability zone, which means that volumes will not fail if an individual drive fails or some other single failure occurs.

The object storage service 110 represent another type of storage within the cloud provider network 120. The object storage service 110 include one or more servers on which data is stored as objects within resources referred to as buckets 111. As shown in FIG. 1, the buckets 111 may include active buckets 111A (e.g., buckets that are accessible by their users and have not been deleted) and recoverable buckets 111B (e.g., buckets that have been deleted and placed in the recovery bin). Each object typically includes the data being stored, a variable amount of metadata that enables various capabilities for the object storage service 110 with respect to analyzing a stored object, and a globally unique identifier or key that can be used to retrieve the object. Objects stored on the object storage service 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage service 110 distributed across different ones of the regions described above, users can choose the region (or regions) where a bucket is stored, for example to optimize for latency. Users can use object storage service 110 for purposes such as storing photos on social media websites, songs on music streaming websites, or files in online collaboration services, to name a few examples. Applications developed in the cloud often take advantage of the vast scalability and metadata characteristics of the object storage service 110. The object storage service 110 can support highly parallel data accesses and transfers.

The object storage service 110 can offer even greater redundancy than the block store service 105, as the object storage service 110 can automatically replicate data into multiple availability zones. The object storage service 110 also have different data throughput than the block store service 105, for example around 20 Mbps for a single stream of data. While the object storage service 110 can be used independently from the instances 116 and volumes 106 described above, they can also be used to provide data backup as described herein with respect to snapshots (e.g., object-stored backups of volume data).

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing system to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services (some of which may not be illustrated in FIG. 1), which may include a compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for facilitating resource recovery can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120.

Example Workflow for Deleting Grouped Resources

Figure 2:
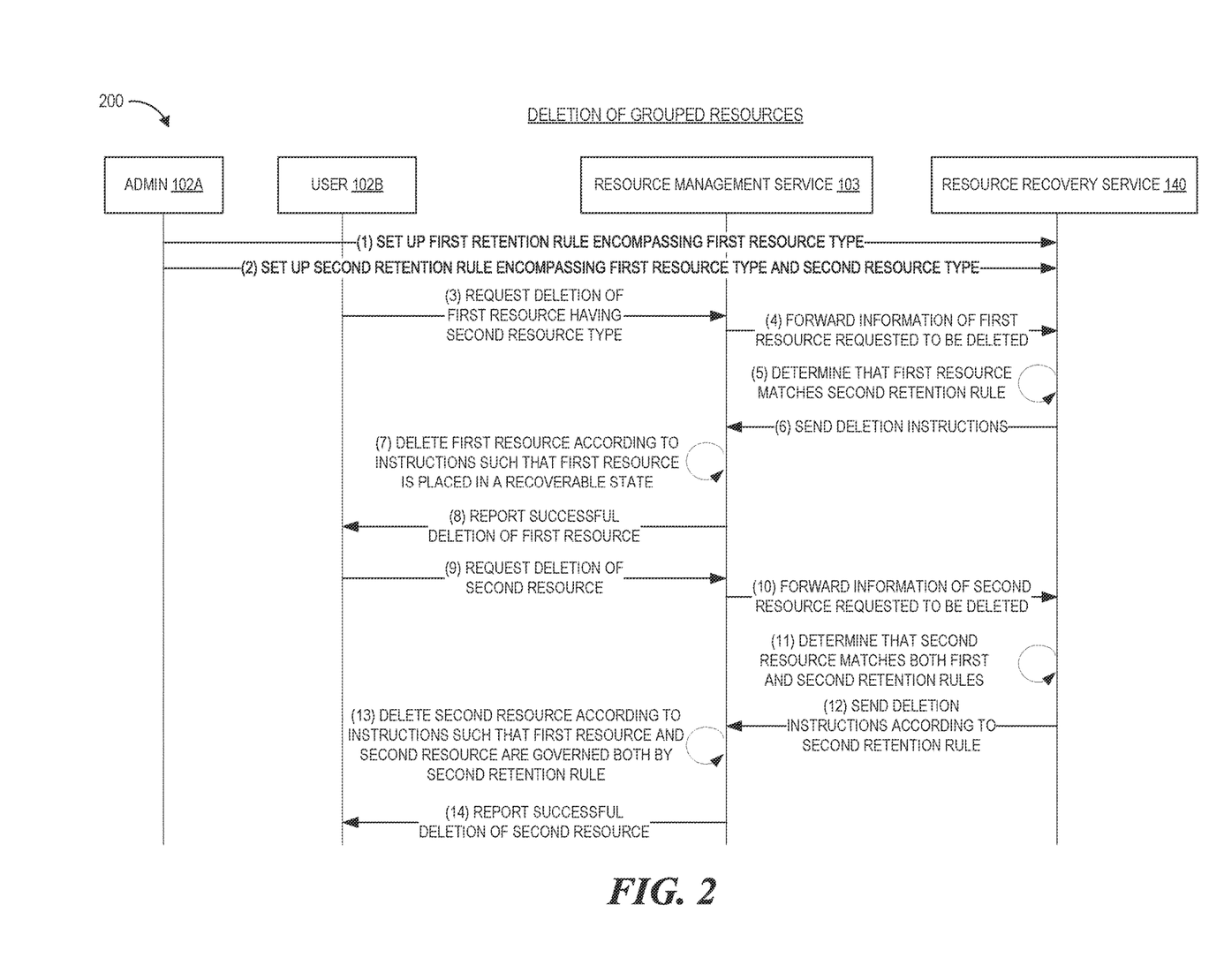
FIG. 2 depicts a workflow diagram an example process for deleting grouped resources in accordance with aspects of the present disclosure.

FIG. 2 depicts a workflow diagram of an example process for deleting grouped resources in accordance with aspects of the present disclosure. As shown in FIG. 2, at (1), an admin 102A sets up a first resource retention rule for a first resource type. At (2), the admin 102A sets up a second resource retention rule encompassing both the first resource type and a second resource type. At (3), a user 102B requests deletion of a first resource having the second resource type. At (4), the resource management service 103 forwards the information of the first resource to the resource recovery service 140. At (5), the resource recovery service 140 determines that the first resource matches the second resource retention rule. At (6), the resource recovery service 140 sends deletion instructions to the resource management service 103. At (7), in response, the resource management service 103 deletes the first resource according to the instructions such that the first resource is placed in a recoverable state (e.g., according to the second resource retention rule). At (8), the resource management service 103 reports to the user 102B that the first resource has been successfully deleted.

At (9), a user 102B requests deletion of a second resource. At (10), the resource management service 103 forwards the information of the second resource to the resource recovery service 140. At (11), the resource recovery service 140 determines that the second resource matches both the first resource retention rule and the second resource retention rule. At (12), the resource recovery service 140, based on determining that the second resource retention rule encompassing multiple resource types (or based on determining that the second resource retention rule encompassing a greater number of resource types than the first resource retention rule), sends deletion instructions to the resource management service 103 according to the second resource retention rule. At (13), in response, the resource management service 103 deletes the second resource according to the instructions such that the deletion and retention behavior for both of the first resource and the second resource is governed by the second retention rule (which may, for example, result in the second resource being placed in a recoverable state for at least as long as the first resource (e.g., for the same retention period or eviction timeline as the first resource)). At (14), the resource management service 103 reports to the user 102B that the second resource has been successfully deleted.

Example Routine for Deleting Grouped Resources

Figure 3:
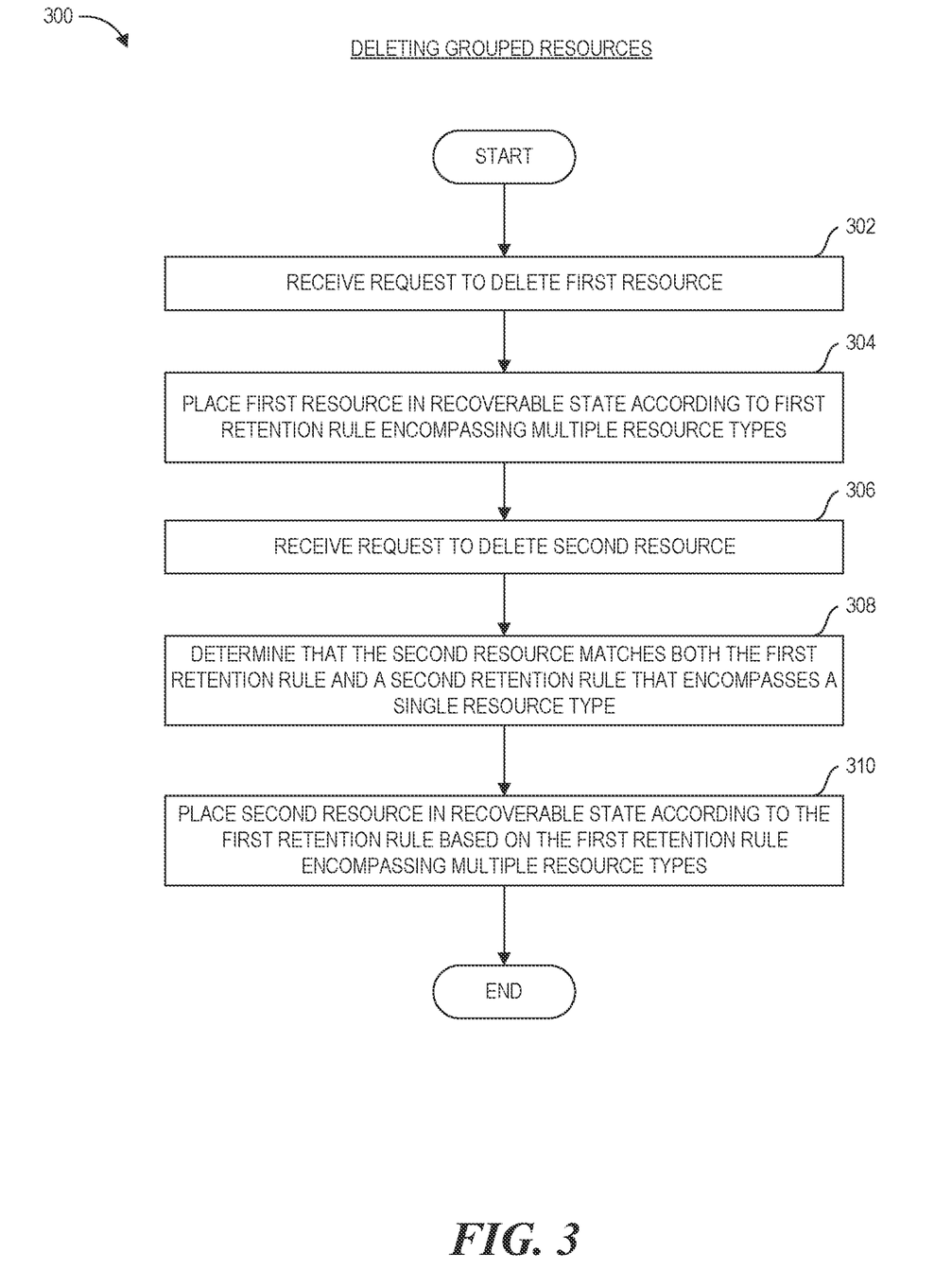
FIG. 3 depicts a flowchart of an example process for deleting grouped resources in accordance with aspects of the present disclosure.

FIG. 3 depicts an illustrative routine 300 for deleting grouped resources in accordance with aspects of the present disclosure. The routine 300 may be carried out, for example, by the resource recovery service 140 or one or more other components of the cloud provider network 120 described herein. For convenience, some or all of the steps of the routine 300 are described as being performed by the resource recovery service 140. For example, the resource recovery service 140 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the resource recovery service 140 receives a request to delete a first resource from a resource management service. For example, the delete request may include any information or metadata associated with the resource being requested to be deleted (or previously requested by another user to be deleted), such as a service identifier associated with the resource management service (which may indicate the resource management service that is currently managing the resource), a resource type identifier indicating the resource type of the resource, a resource identifier (e.g., a unique ID assigned to the resource), one or more tags (e.g., information that is usable by the resource recovery service 140 to perform more fine-grained matching of the resource retention rules).

At block 304, the resource recovery service 140 places the first resource in a recoverable state according to a first retention rule that encompasses multiple resource types. For example, the resource recovery service 140 may determine that the first resource matches one of the resource retention rules maintained (or accessible) by the resource recovery service 140.

At block 306, the resource recovery service 140 receives a request to delete a second resource from another resource management service. For example, the delete request may include any information or metadata associated with the resource being requested to be deleted (or previously requested by another user to be deleted), such as a service identifier associated with the resource management service (which may indicate the resource management service that is currently managing the resource), a resource type identifier indicating the resource type of the resource, a resource identifier (e.g., a unique ID assigned to the resource), one or more tags (e.g., information that is usable by the resource recovery service 140 to perform more fine-grained matching of the resource retention rules).

At block 308, the resource recovery service 140 determines that the second resource matches both the first retention rule and a second retention rule that encompasses a single resource type.

At block 310, the resource recovery service 140, based on determining that the first retention rule encompasses multiple resource types (or based on determining that the first retention rule encompasses a greater number of resource types than the second retention rule), places the second resource according to the first retention rule. In some cases, doing so may result in the second resource being in a recoverable state for at least as long as the first resource is placed in the recoverable state. The routine 300 may then end.

The routine 300 can include fewer, more, or different blocks than those illustrated in FIG. 3 and/or one or more blocks illustrated in FIG. 3 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Deleting a Resource

Figure 4:
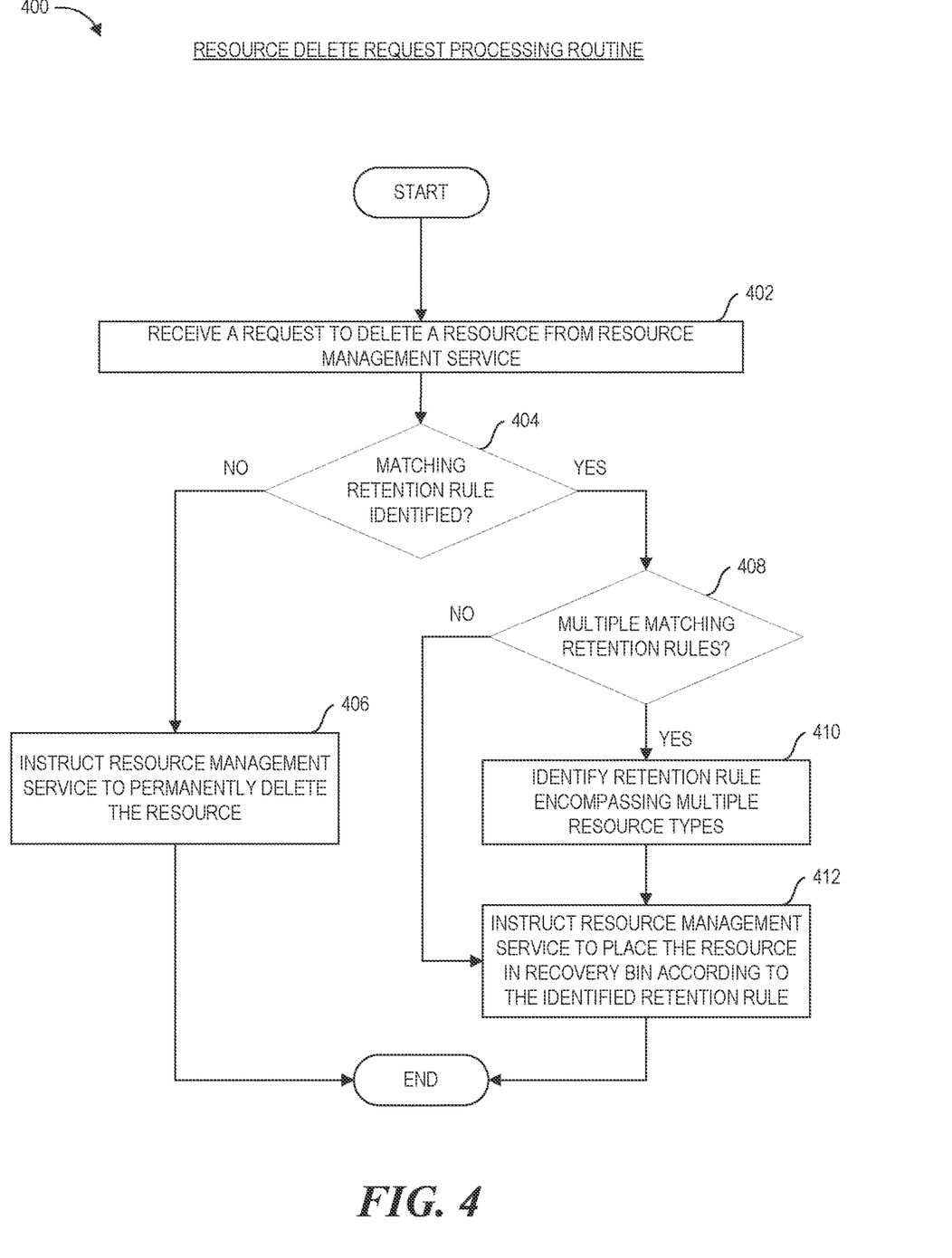
FIG. 4 depicts a flowchart of an example process for deleting a resource in accordance with aspects of the present disclosure.

FIG. 4 depicts an illustrative routine 400 for deleting a resource in accordance with aspects of the present disclosure. The routine 400 may be carried out, for example, by the resource recovery service 140 or one or more other components of the cloud provider network 120 described herein. For convenience, some or all of the steps of the routine 400 are described as being performed by the resource recovery service 140. For example, the resource recovery service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the resource recovery service 140 receives a request to delete a resource from a resource management service. For example, the request may include any information or metadata associated with the resource being requested to be deleted (or previously requested by another user to be deleted), such as a service identifier associated with the resource management service (which may indicate the resource management service that is currently managing the resource), a resource type identifier indicating the resource type of the resource, a resource identifier (e.g., a unique ID assigned to the resource), one or more tags (e.g., information that is usable by the resource recovery service 140 to perform more fine-grained matching of the resource retention rules).

At block 404, the resource recovery service 140 determines whether any resource retention rule matching the resource has been identified. If so, the routine 400 proceeds to block 406, where the resource recovery service 140 instructions the resource management service to permanently delete the resource. Otherwise, the routine 400 proceeds to block 408.

At block 408, the resource recovery service 140 determines whether there exist multiple retention rules that match the resource. If so, the routine 400 proceeds to block 410. Otherwise, the routine 400 proceeds to block 412.

At block 410, the resource recovery service 140 identifies the retention rule that encompasses multiple resource types for use in connection with the resource requested to be deleted at block 402. In some implementations, the resource recovery service 140 may identify the retention rule that encompasses the greatest number of resource types among all the matching retention rules. In other implementations, the resource recovery service 140 may identify the retention rule that has the highest priority assigned thereto among all the matching retention rules. In yet other implementations, the resource recovery service 140 may identify the retention rule that has the most conservative retention policy (e.g., requiring that the resource be retained in the recoverable state for the longest period of time and/or requiring that the resource not allowed to be evicted from the recoverable state for the longest period of time).

In some implementations, the resource recovery service 140 may identify the retention rule based on the resource type of the resource requested to be deleted at block 402. For example, if the resource recovery service 140 determines that the deleted resource is a snapshot, the resource recovery service 140 may identify a matching retention rule to be used for the deleted resource based on the matching retention rule encompassing both snapshots and resources that depend or rely on snapshots (e.g., backups created based on snapshots, or machine images that store information required to launch an instance using snapshots), such that the deleted resource can be kept in a recoverable state at least as long as the resources that depend on the deleted resource. The dependency or reliance relationship can be incorporated into the retention rules (e.g., by creating retention rules that encompass both the independent resource and the dependent resource) and can be created between any combination of the resource types described herein, such as snapshot, compute instance, collection or stack of multiple resources, machine image, security group, storage volume, network interface, backup, disk, storage bucket, and the like.

At block 412, the resource recovery service 140 places the resource in a recoverable state according to the identified matching resource retention rule. The routine 400 may then end.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 5:
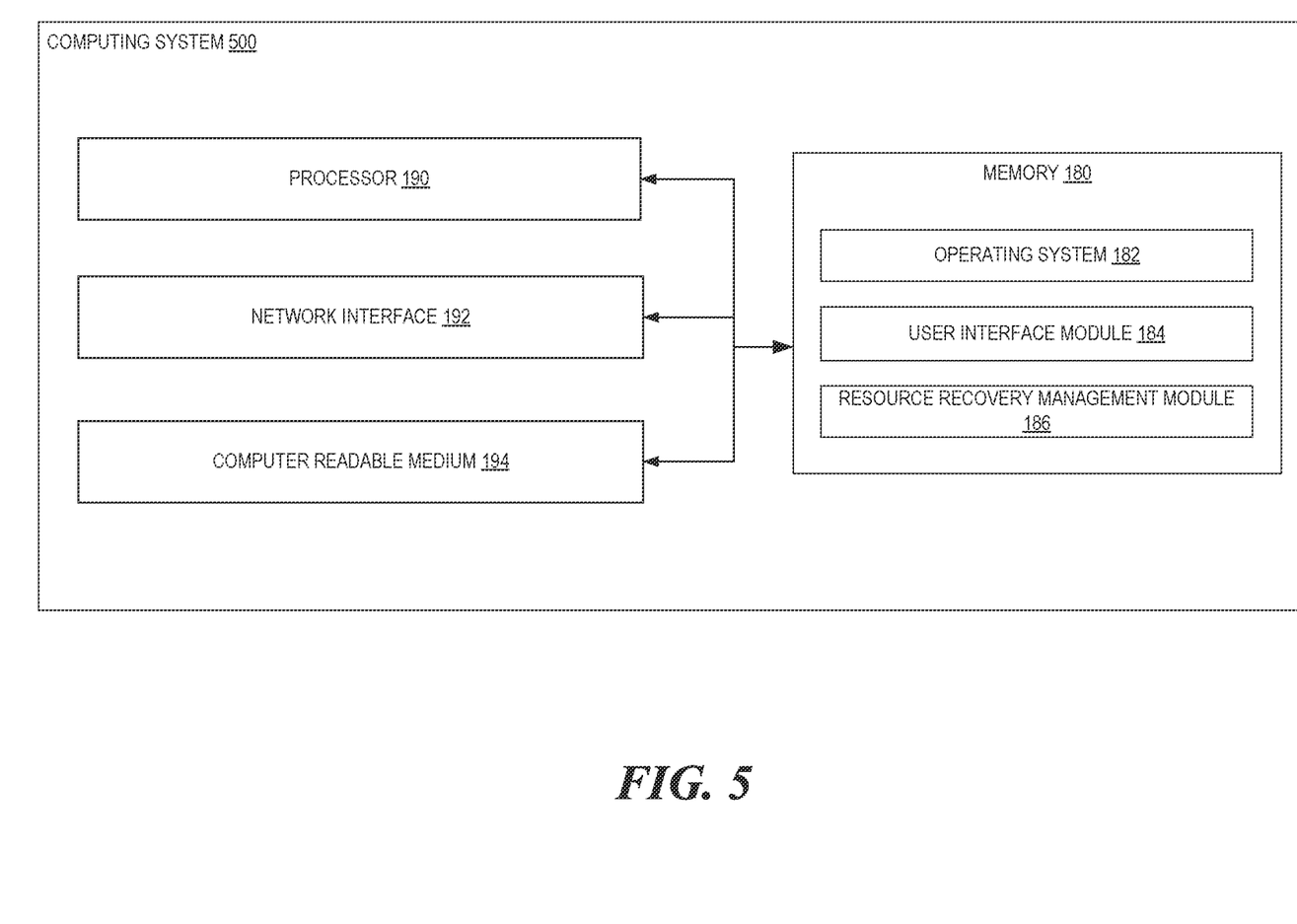
FIG. 5 depicts a general architecture of a computing device or system usable to implement one or more components descried herein, in accordance with aspects of the present disclosure.

FIG. 5 depicts an example architecture of a computing system 500 that can be used to perform one or more of the techniques described herein or illustrated in FIGS. 1-4. The general architecture of the computing system 500 depicted in FIG. 5 includes an arrangement of computer hardware and software modules that may be used to implement one or more aspects of the present disclosure. The computing system 500 may include many more (or fewer) elements than those shown in FIG. 5. It is not necessary, however, that all of these elements be shown in order to provide an enabling disclosure. For example, the computing system 500 may be used to implement one or more of the elements described herein, including the resource recovery service 140, block store service 105, object storage service 110, object storage service 110, compute service 115, and/or the user computing devices 102.

As illustrated, the computing system 500 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 500. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a resource recovery management module 186 that may be executed by the processor 190. In one embodiment, the resource recovery management module 186 implements various aspects of the present disclosure, e.g., those illustrated in FIGS. 1-4 or described with reference to FIGS. 1-4.

Although a single processor, a single network interface, a single computer-readable medium, and a single memory are illustrated in the example of FIG. 5, in other implementations, the computing system 500 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a plurality of resource management services each comprising computer hardware and configured to manage creation and deletion of respective resource types of user resources; and a resource recovery service comprising computer hardware and in network communication with the plurality of resource management services, wherein the network resource recovery service is configured to at least: receive, from an administrative user of the resource recovery service, a first resource retention rule that specifies to place resources of a first resource type in a recoverable state upon deletion and further specifies a first resource retention period for which resources of the first resource type are to be kept in the recoverable state before permanent deletion; receive, from the administrative user of the resource recovery service, a second resource retention rule that specifies to place resources of the first resource type and resources of a second resource type in the recoverable state upon deletion and further specifies a second resource retention period for which resources of the first resource type and resources of the second resource type are to be kept in the recoverable state before permanent deletion, wherein the first resource retention rule and the second resource retention rule apply to other users whose accounts are managed by the administrative user; receive, from a particular user of the other users, a request to delete a first resource of the second resource type from a first resource management service of the plurality of resource management services; determine that the first resource matches the second resource retention rule specified by the administrative user; output, to the first resource management service, an instruction to place the first resource in a recovery bin in accordance with the second resource retention rule; receive, from a second resource management service of the plurality of resource management services, a request to delete a second resource of the first resource type; despite both the first resource retention rule and the second resource retention rule matching the second resource, determine that the second resource is to be placed in the recovery bin according to the second resource retention rule encompassing both the first resource type and the second resource type; and output, to the second resource management service, an instruction to place the second resource in the recovery bin in accordance with the second resource retention rule that was used to place the first resource in the recovery bin.

EI 2: The cloud provider system of EI 1, wherein the request to delete the second resource is automatically generated by the second resource management service in response determining that the first resource has been deleted.

EI 3: The cloud provider system of EI 1, wherein the first resource and the second resource are scheduled to be evicted from the recovery bin at the same time.

EI 4: The cloud provider system of EI 1, wherein the plurality of resource management services comprises one or more of a database service configured to create or delete database tables, a block store service configured to create or delete data storage volumes, a snapshot service configured to create or delete snapshots of data storage volumes, an object storage service configured to create or delete data storage buckets, or a compute service configured to create or delete compute instances.

EI 5: A computer-implemented method comprising: receiving a request to delete a first resource of a first resource type from a resource management service of a plurality of resource management services; determining that the first resource matches a first resource retention rule and a second resource retention rule of a plurality of resource retention rules managed by a resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion; determining that the first resource is to be kept in the recoverable state according to the second resource retention rule; and outputting, to the resource management service, an instruction to place the first resource in the recoverable state in accordance with the second resource retention rule.

EI 6: The computer-implemented method of EI 5, further comprising determining that the first resource is to be kept in the recoverable state according to the second resource retention rule based on the second resource retention rule encompassing a greater number of resource types than the first resource retention rule.

EI 7: The computer-implemented method of EI 5, further comprising determining that the first resource is to be kept in the recoverable state according to the second resource retention rule based on the second resource retention rule encompassing multiple resource types.

EI 8: The computer-implemented method of EI 5, further comprising determining that the first resource is to be kept in the recoverable state according to the second resource retention rule based on the second resource retention rule having a more conservative resource retention policy than the first resource retention rule.

EI 9: The computer-implemented method of EI 5, further comprising determining that the first resource is to be kept in the recoverable state according to the second resource retention rule based on the second resource retention rule having a retention period that is longer than that of the first resource retention rule.

EI 10: The computer-implemented method of EI 5, wherein the request to delete the first resource is automatically generated by the resource management service in response determining that a second resource matching the second resource retention rule has been deleted.

EI 11: The computer-implemented method of EI 5, wherein the request to delete the first resource is generated in response to a request from a user computing device in network communication with the resource management service.

EI 12: The computer-implemented method of EI 5, wherein the first resource is scheduled to be permanently deleted at the same time as or prior to a second resource having the second resource type that is placed in the recoverable state after the first resource according to the second resource retention rule.

EI 13: A non-transitory computer readable medium storing instructions that, when executed by a computing system within a cloud provider network, cause the computing system to perform operations comprising: receiving a request to delete a first resource of a first resource type from a resource management service of a plurality of resource management services; determining that the first resource matches a first resource retention rule and a second resource retention rule of a plurality of resource retention rules managed by a resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion; determining that the first resource is to be kept in the recoverable state according to the second resource retention rule; and outputting, to the resource management service, an instruction to place the first resource in the recoverable state in accordance with the second resource retention rule.

EI 14: The non-transitory computer readable medium of EI 13, storing further instructions that, when executed by the computing system, cause the computing system to perform operations comprising determining that the first resource is to be kept in the recoverable state according to the second resource retention rule based on the second resource retention rule encompassing a greater number of resource types than the first resource retention rule.

EI 15: The non-transitory computer readable medium of EI 13, storing further instructions that, when executed by the computing system, cause the computing system to perform operations comprising determining that the first resource is to be kept in the recoverable state according to the second resource retention rule based on the second resource retention rule encompassing multiple resource types.

EI 16: The non-transitory computer readable medium of EI 13, storing further instructions that, when executed by the computing system, cause the computing system to perform operations comprising determining that the first resource is to be kept in the recoverable state according to the second resource retention rule based on the second resource retention rule having a more conservative resource retention policy than the first resource retention rule.

EI 17: The non-transitory computer readable medium of EI 13, storing further instructions that, when executed by the computing system, cause the computing system to perform operations comprising determining that the first resource is to be kept in the recoverable state according to the second resource retention rule based on the second resource retention rule having a retention period that is longer than that of the first resource retention rule.

EI 18: The non-transitory computer readable medium of EI 13, wherein the request to delete the first resource is automatically generated by the resource management service in response determining that a second resource matching the second resource retention rule has been deleted.

EI 19: The non-transitory computer readable medium of EI 13, wherein the request to delete the first resource is generated in response to a request from a user computing device in network communication with the resource management service.

EI 20: The non-transitory computer readable medium of EI 13, wherein the first resource is scheduled to be permanently deleted at the same time as or prior to a second resource having the second resource type that is placed in the recoverable state after the first resource according to the second resource retention rule.

EI 21: A cloud provider system comprising: a plurality of resource management services each comprising computer hardware and configured to manage creation and deletion of respective resource types of user resources; and a resource recovery service comprising computer hardware and in network communication with the plurality of resource management services, wherein the network resource recovery service is configured to at least: receive, from an administrative user of the resource recovery service, a request to delete a first resource of a first resource type from a resource management service of the plurality of resource management services; determine that the first resource matches a first resource retention rule and a second resource retention rule of a plurality of resource retention rules managed by the resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion; despite both the first resource retention rule and the second resource retention rule matching the first resource, determine that the first resource is to be placed in the recovery bin according to the second resource retention rule encompassing both the first resource type and the second resource type; and output, to the resource management service, an instruction to place the first resource in the recovery bin in accordance with the second resource retention rule.

EI 22: The cloud provider system of EI 21, wherein the request to delete the first resource is automatically generated in response determining that a second resource dependent on the first resource has been deleted.

EI 23: The cloud provider system of EI 22, wherein the first resource and the second resource are scheduled to be evicted from the recovery bin at the same time.

EI 24: The cloud provider system of EI 21, wherein the plurality of resource management services comprises one or more of a database service configured to create or delete database tables, a block store service configured to create or delete data storage volumes, a snapshot service configured to create or delete snapshots of data storage volumes, an object storage service configured to create or delete data storage buckets, or a compute service configured to create or delete compute instances.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a plurality of resource management services each comprising computer hardware and configured to manage creation and deletion of respective resource types of user resources; and
   a resource recovery service comprising computer hardware and in network communication with the plurality of resource management services, wherein the network resource recovery service is configured to at least:
      receive, from an administrative user of the resource recovery service, a request to delete a first resource of a first resource type from a resource management service of the plurality of resource management services;
      determine that the first resource matches a first resource retention rule and a second resource retention rule of a plurality of resource retention rules managed by the resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion;
      despite both the first resource retention rule and the second resource retention rule matching the first resource, determine that the first resource is to be placed in the recoverable state according to the second resource retention rule encompassing both the first resource type and the second resource type; and
      output, to the resource management service, an instruction to place the first resource in the recoverable state in accordance with the second resource retention rule.

2. The cloud provider system of claim 1, wherein the request to delete the first resource is automatically generated in response determining that a second resource dependent on the first resource has been deleted.

3. The cloud provider system of claim 2, wherein the first resource and the second resource are scheduled to be evicted from the recoverable state at the same time.

4. The cloud provider system of claim 1, wherein the plurality of resource management services comprises one or more of a database service configured to create or delete database tables, a block store service configured to create or delete data storage volumes, a snapshot service configured to create or delete snapshots of data storage volumes, an object storage service configured to create or delete data storage buckets, or a compute service configured to create or delete compute instances.

5. A computer-implemented method comprising:
   receiving a request to delete a first resource of a first resource type from a resource management service of a plurality of resource management services;
   determining that the first resource matches a first resource retention rule and a second resource retention rule of a plurality of resource retention rules managed by a resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion;
   determining that the first resource is to be kept in the recoverable state according to the second resource retention rule; and
   outputting, to the resource management service, an instruction to place the first resource in the recoverable state in accordance with the second resource retention rule.

6. The computer-implemented method of claim 5, further comprising determining that the first resource is to be kept in the recoverable state according to the second resource retention rule based on the second resource retention rule encompassing a greater number of resource types than the first resource retention rule.

7. The computer-implemented method of claim 5, further comprising determining that the first resource is to be kept in the recoverable state according to the second resource retention rule based on the second resource retention rule encompassing multiple resource types.

8. The computer-implemented method of claim 5, further comprising determining that the first resource is to be kept in the recoverable state according to the second resource retention rule based on the second resource retention rule having a more conservative resource retention policy than the first resource retention rule.

9. The computer-implemented method of claim 5, further comprising determining that the first resource is to be kept in the recoverable state according to the second resource retention rule based on the second resource retention rule having a retention period that is longer than that of the first resource retention rule.

10. The computer-implemented method of claim 5, wherein the request to delete the first resource is automatically generated by the resource management service in response determining that a second resource matching the second resource retention rule has been deleted.

11. The computer-implemented method of claim 5, wherein the request to delete the first resource is generated in response to a request from a user computing device in network communication with the resource management service.

12. The computer-implemented method of claim 5, wherein the first resource is scheduled to be permanently deleted at the same time as or prior to a second resource having the second resource type that is placed in the recoverable state after the first resource according to the second resource retention rule.

13. A non-transitory computer-readable medium storing instructions that, when executed by a computing system within a cloud provider network, cause the computing system to perform operations comprising:
   receiving a request to delete a first resource of a first resource type from a resource management service of a plurality of resource management services;
   determining that the first resource matches a first resource retention rule and a second resource retention rule of a plurality of resource retention rules managed by a resource recovery service in network communication with the resource management service, wherein the first resource retention rule specifies that resources of the first resource type are to be kept in a recoverable state before permanent deletion, and the second resource retention rule specifies that resources of the first resource type and resources of a second resource type are to be kept in the recoverable state before permanent deletion;
   determining that the first resource is to be kept in the recoverable state according to the second resource retention rule; and
   outputting, to the resource management service, an instruction to place the first resource in the recoverable state in accordance with the second resource retention rule.

14. The non-transitory computer-readable medium of claim 13, storing further instructions that, when executed by the computing system, cause the computing system to perform operations comprising determining that the first resource is to be kept in the recoverable state according to the second resource retention rule based on the second resource retention rule encompassing a greater number of resource types than the first resource retention rule.

15. The non-transitory computer-readable medium of claim 13, storing further instructions that, when executed by the computing system, cause the computing system to perform operations comprising determining that the first resource is to be kept in the recoverable state according to the second resource retention rule based on the second resource retention rule encompassing multiple resource types.

16. The non-transitory computer-readable medium of claim 13, storing further instructions that, when executed by the computing system, cause the computing system to perform operations comprising determining that the first resource is to be kept in the recoverable state according to the second resource retention rule based on the second resource retention rule having a more conservative resource retention policy than the first resource retention rule.

17. The non-transitory computer-readable medium of claim 13, storing further instructions that, when executed by the computing system, cause the computing system to perform operations comprising determining that the first resource is to be kept in the recoverable state according to the second resource retention rule based on the second resource retention rule having a retention period that is longer than that of the first resource retention rule.

18. The non-transitory computer-readable medium of claim 13, wherein the request to delete the first resource is automatically generated by the resource management service in response determining that a second resource matching the second resource retention rule has been deleted.

19. The non-transitory computer-readable medium of claim 13, wherein the request to delete the first resource is generated in response to a request from a user computing device in network communication with the resource management service.

20. The non-transitory computer-readable medium of claim 13, wherein the first resource is scheduled to be permanently deleted at the same time as or prior to a second resource having the second resource type that is placed in the recoverable state after the first resource according to the second resource retention rule.

\* \* \* \* \*